United States Patent
Yamazaki

(10) Patent No.: US 7,793,974 B2
(45) Date of Patent: Sep. 14, 2010

(54) GAS GENERATOR FOR HUMAN BODY RESTRAINING APPARATUS OF VEHICLE

(75) Inventor: Masayuki Yamazaki, Tatsuno (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 538 days.

(21) Appl. No.: 11/770,485

(22) Filed: Jun. 28, 2007

(65) Prior Publication Data
US 2008/0012278 A1 Jan. 17, 2008

Related U.S. Application Data

(60) Provisional application No. 60/831,691, filed on Jul. 19, 2006.

(30) Foreign Application Priority Data
Jul. 13, 2006 (JP) .............................. 2006-192713

(51) Int. Cl.
*B60R 21/26* (2006.01)
(52) U.S. Cl. ....................................... 280/741
(58) Field of Classification Search ................ 280/741, 280/736; 102/530, 531
See application file for complete search history.

(56) References Cited

U.S. PATENT DOCUMENTS

| | | | |
|---|---|---|---|
| 4,959,011 A * | 9/1990 | Nilsson | ....................... 431/263 |
| 6,763,764 B2 | 7/2004 | Avetisian et al. | |
| 2002/0174792 A1 | 11/2002 | Kubozuka et al. | |
| 2003/0154876 A1 | 8/2003 | Avetisian et al. | |
| 2004/0195813 A1 | 10/2004 | Canterberry et al. | |
| 2004/0226472 A1 | 11/2004 | Oda | |
| 2009/0091110 A1* | 4/2009 | Nakayasu et al. | ........... 280/741 |
| 2009/0114109 A1* | 5/2009 | Overton et al. | ............... 102/200 |
| 2009/0167006 A1* | 7/2009 | Schonhuber et al. | ........ 280/741 |

FOREIGN PATENT DOCUMENTS

| | | |
|---|---|---|
| DE | 3738436 C1 | 11/1988 |
| DE | 19620758 A1 | 11/1997 |
| EP | 1447641 A1 | 8/2004 |
| JP | 2003-161599 A | 6/2003 |

* cited by examiner

*Primary Examiner*—Eric Culbreth
(74) *Attorney, Agent, or Firm*—Birch, Stewart, Kolasch & Birch, LLP

(57) ABSTRACT

The present invention relates to a gas generator for a restraining apparatus of a vehicle including:
a housing having a gas discharge port;
a gas source; and
an ignition device accommodated inside the housing, the ignition device being connected to an outer power source through an opening of the housing, the ignition device including a igniter body which has a conductive pin and is fixed by crimping an igniter collar, the igniter collar having a plug-accommodating chamber for inserting a plug to be connected with the conductive pin, at least part of a wall surface of the plug-accommodating chamber being formed by a holder which is an independent member formed of a non-electroconductive material and is disposed inside the igniter collar, the holder being fixed in a state of contact with the igniter collar and a housing wall surface including a circumferential edge of the opening.

5 Claims, 4 Drawing Sheets

GAS GENERATOR FOR HUMAN BODY RESTRAINING APPARATUS OF VEHICLE

This application claims priority under 35 U.S.C. §119(a) to Patent Application No. 2006-192713 filed in Japan on 13 Jul. 2006, and under 35 U.S.C. §119(e) to U.S. Provisional Application No. 60/831,691 filed on 19 Jul. 2006, both of which are incorporated by reference.

BACKGROUND OF INVENTION (1) Field of Invention

The present invention relates to a gas generator for a restraining apparatus of a vehicle that is suitable for an airbag apparatus or the like.

(2) Description of Related Art

As gas generators for a restraining apparatuses for vehicles such as airbag apparatuses, a gas generator in which only a gas generating agent is used as gas source, a gas generator in which only a pressurized gas such as argon or helium is used, or a gas generator in which both the generating agent and the pressurized gas are used are known. In all of these, an igniter is used as an actuation device.

U.S. Pat. No. 6,763,764 discloses an invention relating to a pyrotechnic ignition system of a dual type. Two igniters 4 shown in FIG. 1 and FIG. 2 have a non-conductive (Nylon or the like) body 8 that is injection-molded around a metal retainer 6. The two igniters 4 are connected to a base 16 with the injection-molded body 8. The body 8 is disposed above and below the retainer 6, and a recession serving as a plug connection portion (space where a conductive pin 14 is present) is formed inside the body.

The recession serving as a plug connection portion as shown in FIG. 1 and FIG. 2 can be formed by injection-molding using the above-stated resin, and the processing thereof is easier by comparison with the case of being formed with metal that needs cutting work. The advantageous result is that the production cost can be reduced.

SUMMARY OF INVENTION

The present invention relates to a gas generator for a restraining apparatus of a vehicle including:
 a housing having a gas discharge port,
 a gas source, and
 an ignition device accommodated inside the housing, the ignition device being connected to an outer power source through an opening of the housing, the ignition device including a igniter body which has a conductive pin and is fixed by crimping an igniter collar, the igniter collar having a plug-accommodating chamber for inserting a plug to be connected with the conductive pin, at least part of a wall surface of the plug-accommodating chamber being formed by a holder which is an independent member formed of a non-electroconductive material and is disposed inside the igniter collar, the holder being fixed in a state of contact with the igniter collar and a housing wall surface including a circumferential edge of the opening.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION a2

In U.S. Pat. No. 6,763,764, when a resin is injection-molded onto a metal, at least an antirust treatment has to be conducted on the portion of the metal that will be in contact with the resin. Rust especially easily appears when iron is used as the metal, and when rust appears in the zones of contact with the resin, a gap can be produced between the metal and the resin and the resistance to moisture can be degraded. Accordingly, an antirust treatment such as plating has to be conducted in advance on the metal component (retainer 6). As a result, the number of process steps increases and the production cost cannot be reduced. In addition, the igniter is mounted in a state in which the body 8 is in contact with the base 16, which is disadvantageous to the fixing strength.

The present invention relates to a gas generator for a restraining apparatus of a vehicle that makes it possible to simplify an igniter manufacturing process and also to simplify the gas generator assembly process.

In the gas generator in accordance with the present invention, a gas source, ignition device, and if necessary structural components such as a coolant/filter and a retainer are accommodated inside a housing having a gas discharge port. The gas source is selected according to the type of the gas generator from a gas generating agent that generates a combustion gas, a pressurized gas such as argon or helium, or a combination thereof.

A housing is used in which two shells (for example, a diffuser shell having a gas discharge port and a closure shell for attaching the igniter) are mated by flanges thereof and integrated by welding in the contact portions of the flanges. In the housing, an opening for inserting a plug for connection to the ignition device is formed in any one shell (for example, the closure shell). The integration of the diffuser shell and closure shell by welding is performed after the necessary components such as the ignition device, gas source, and filter are accommodated therein.

The ignition device is fixed by crimping after the igniter body is inserted into the igniter collar made from a metal such as iron. If necessary, a sealing material (gasket made from a resin or a rubber) can be disposed between the igniter collar and the igniter body.

In accordance with the present invention, the plug accommodation chamber for inserting a plug, located inside the igniter collar faces the opening of the housing and at least part of the wall surface of this chamber is formed by a holder composed of a non-conductive material.

Figure 1:
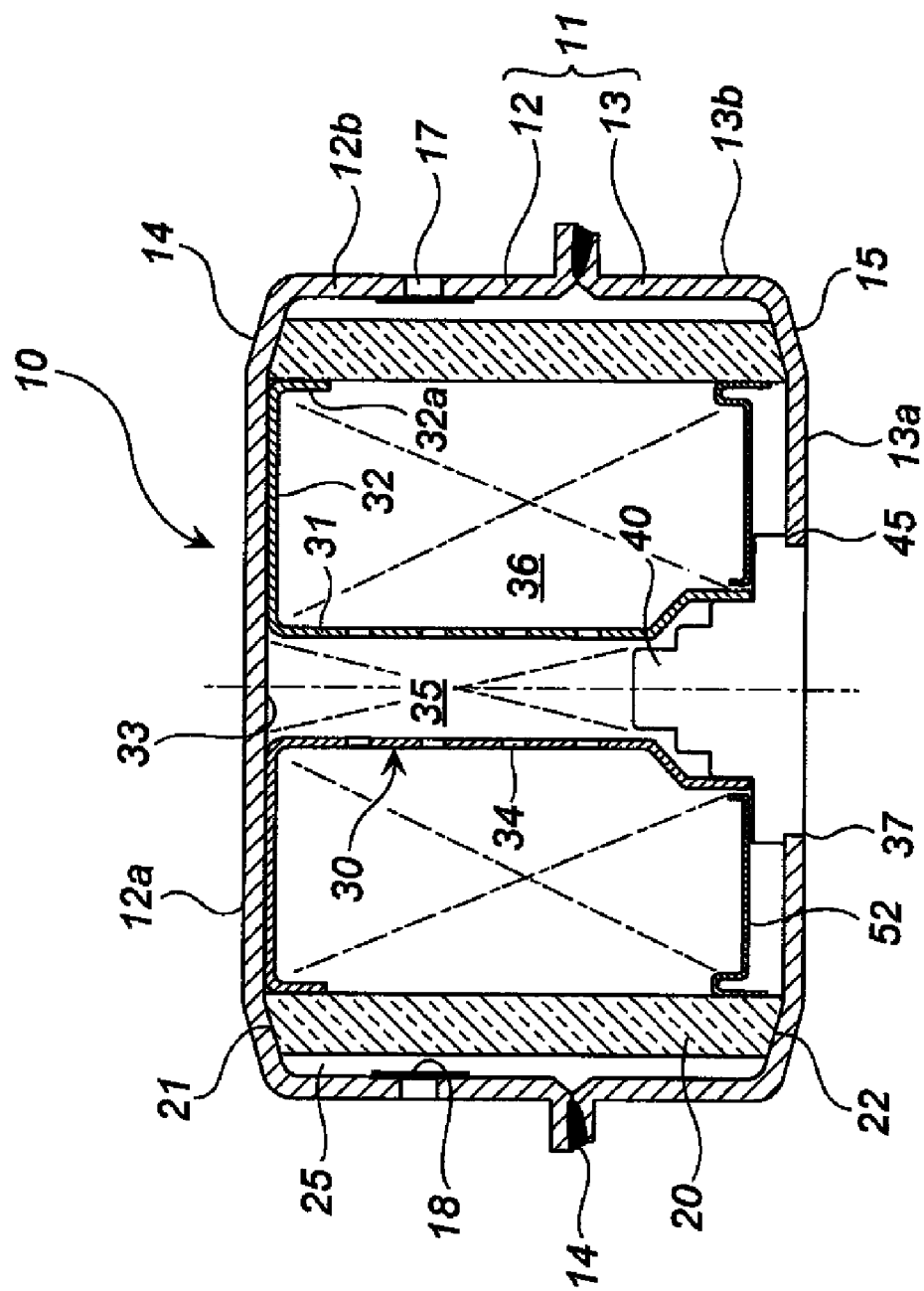
FIG. 1 shows a longitudinal sectional view of the gas generator according to the present invention.
Figure 2:
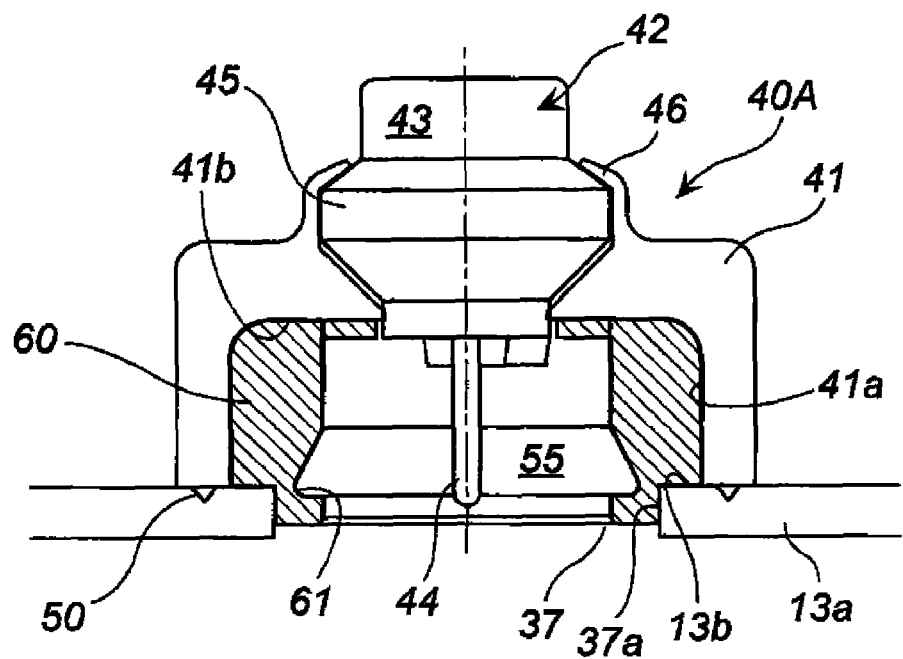
FIG. 2 shows a longitudinal sectional view of the igniter used in the present invention and an attachment structure thereof.

The holder is an independent member, that is, molded separately from the igniter collar and the housing, and is disposed by being inserted into the igniter collar. Therefore, antirust treatment of a surface of the igniter collar that is in contact with the holder is unnecessary even when the holder is assembled with an igniter collar made from a metal such as iron. The holder is composed of a non-conductive material such as Nylon and ABS resin. For example, the holder can be obtained by injection-molding. As shown in FIG. 1 and FIG. 2 of U.S. Pat. No. 6,763,764, a groove serving as means for preventing a plug from falling out during the insertion thereof may be formed in the inner wall surface of the holder In addition, convex portions and concave portions or a step may be formed. Because the grooves, etc., may be also formed by the injection-molding at the same time, cutting work such as that needed in the case of a metal collar becomes unnecessary.

Because the holder is inserted into the igniter collar and forms at least part of the wall surface of the plug accommodation chamber, the holder has an external shape such that can be inserted into the igniter collar and an internal shape such that allows the plug to be inserted into the holder. In accordance with the present invention, when the external shape and/or internal shape of the holder is not of the desired shape due to malfunction during injection-molding or the like, only the holder may be replaced and the igniter body and igniter collar still can be used. Therefore, the unnecessary waste of material is prevented.

The present invention further relates to the gas generator for a restraining apparatus of a vehicle, wherein the igniter collar has an inner diameter larger than a diameter of the opening of the housing and is disposed inside the housing over the opening or covering the opening; and the holder is fixed in a state of contact with a circumferential edge of the opening of the housing, an inner wall surface located in the vicinity of the opening of the housing, and an inner wall surface of the igniter collar.

If the igniter collar is thus disposed, a step is formed by the circumferential edge of the opening of the housing, the inner wall surface located in the vicinity of the opening of the housing, and the inner wall surface of the igniter collar. Therefore, a fixing strength is increased by inserting the holder of a shape matching that of the step.

The igniter collar is disposed inside the housing over the opening of the housing (for example, inside a closure shell before it is covered with a diffuser shell) after the holder has been inserted therein. Then, the igniter collar is directly fixed to the inner wall surface of the housing by resistance welding. The fixing strength of the igniter collar itself is also increased by such welding.

The present invention further relates to the gas generator for a restraining apparatus of a vehicle, wherein a wall surface around the opening of the housing protrudes inwardly to form an annular wall surface portion;

the annular wall surface portion has an annular circumferential wall surface formed of an outer wall surface of the housing prior to processing and an annular distal end surface formed of a circumferential edge of the opening prior to processing;

the igniter collar is fixed to a part of the annular distal end surface; and the holder is fixed in a state of contact with a remaining portion of the annular distal end surface, the annular circumferential wall surface, and an inner wall surface of the igniter collar.

If the igniter collar is thus disposed, a step is formed by the remaining portion of the annular distal end surface, the annular circumferential wall surface, and the inner wall surface of the igniter collar. Therefore, the holder is prevented from being loose and the fixing strength thereof can be increased by inserting the holder that has a shape matching that of the step.

The igniter collar is disposed inside the housing over the opening of the housing (for example, inside a closure shell before it is covered by a diffuser shell) after the holder has been inserted therein. Then, the igniter collar is fixed by resistance welding or the like in the contract portion of the igniter collar and the annular distal end surface. As a result, the distance between the welded portion and the inner wall surface of the holder is increased and the heat generated during welding is hardly transferred to the inner wall surface of the holder. Therefore, the inner wall surface of the holder is prevented from heat-induced deformation. In particular, such a configuration is especially preferred because it prevents thermal deformation of the convex portions and concave portions, the step, and the groove formed on the inner wall surface of the holder which serve as means for preventing the plug from falling out.

The present invention further relates to the gas generator for a restraining apparatus of a vehicle, wherein the inner wall surface of the igniter collar has convex portions and concave portions, the outer wall surface of the holder that is in contact with the inner wall surface of the igniter collar has convex portions and concave portions that correspond in shape to convex portions and concave portions of the inner wall surface of the igniter collar, and the convex portions and concave portions of the respective wall surfaces that are brought into contact are mutually engaged so that the holder is prevented from rotating in the circumferential direction.

Because the direction in which the plug is connected to the igniter is predetermined, if the holder located inside the gas generator rotates due to external vibrations during transportation (before the plug is connected and prior to installation on the vehicle), the plug cannot be connected to the rotated holder. And an operation of returning the holder to the original position has to be performed. However, with the above-described configuration, the holder is prevented from rotating and the above-described problems are prevented from occurring.

The present invention further relates to the gas generator for a restraining apparatus of a vehicle, wherein the holder is an elastic holder formed of an elastic material and includes a top surface having an orifice in a central portion and a circumferential surface, the top surface and the circumferential surface are provided with a cleavage portion integral with the orifice, the cleavage portion is formed to be contracted, when an external force is applied, and to be restored to the original form, when the external force is released; and the elastic holder disposed inside the igniter collar is fixed in a state of pressing against the inner wall surface of the igniter collar.

By using such an elastic holder, the holder can be inserted after welding and fixing the igniter collar to the housing. Therefore, the adverse effect of the welding heat on the holder is completely eliminated. When the holder is inserted, it is inserted in a contracted state in which an external force is applied so as to close the cleavage portion, and if the external force is thereafter removed, the cleavage portion is expanded and the elastic holder is fixed inside the igniter collar.

The gas generator for a restraining apparatus of a vehicle in accordance with the present invention facilitates the manufacture and assembly of the igniter that is a constituent part thereof.

EMBODIMENTS OF INVENTION

Gas Generator of FIG. 1

FIG. 1 is a longitudinal sectional view of a gas generator for a restraining apparatus of a vehicle. A housing 11 of a gas generator 10 is formed by joining a diffuser shell 12 that forms a top plate 12a and a circumferential wall 12b and a closure shell 13 that forms a bottom plate 13a and a circumferential wall 13b by laser welding in a welding section 14.

A gas discharge port 17 is provided in the diffuser shell 12 and closed with an aluminum seal tape 18 to prevent moisture penetration.

A cylindrical filter 20 is disposed inside the housing 11. End surfaces 21, 22 of the cylindrical filter 20 abut against and press-contact with an upper annular inclined surface 14 and a lower annular inclined surface 15 formed at the diffuser shell 12 and the closure shell 13, respectively, in the axial direction of the housing 11. As a result, a short-pass of the combustion gas from the contact surfaces of the upper annular inclined surface 14, lower annular inclined surface 15 and the two end surfaces 21, 22 is prevented. The cylindrical filter 20 which is used in the invention can be substantially obtained by weaving a flat weave wire mesh into multiple layers and compressing in a mold or by continuously winding a single wire rod in a layer-like fashion.

The cylindrical filter 20 is disposed so that a gap 25 is present between the filter and circumferential wall portions 12b, 13b, and the generated gas passes through the entire region of the cylindrical filter 20, thereby improving the filtration and cooling effects.

A tubular member 30 is disposed concentrically with the housing 11 inside the housing 11. The tubular member 30 has a tubular main body portion 31 and an annular flat plate 32 that is formed integrally with the main body portion 31 and extends in the radial direction of the housing from the circumferential edge of the opening at one end. The main body portion 31 and the annular flat plate 32 may be obtained by integrating separate members.

The inner space of the tubular member 30 serves as a first combustion chamber 35, and the outer space serves as a second combustion chamber 36. An ignition device 40 and a prescribed amount of a first gas generating agent (not shown in the drawing) are accommodated inside the first combustion chamber 35.

The ignition device 40 is an assembly of an igniter body and an igniter collar and disposed over an opening 37 of the housing 11 (closure shell 13). An ignition device 40A shown in FIG. 2 or an ignition device 40B shown in FIG. 3 of another embodiment can be used as the ignition device.

The first gas generating agent is ignited and combusted by the actuation of the ignition device 40 and causes the ignition and combustion of the second gas generating agent to produce gas serving as an airbag inflation medium. The gas generated by the combustion of the first gas generating agent itself also can be used for inflating the airbag.

A plurality of communication holes 34 are provided in the main body portion 31 of the tubular member 30 to be equidistantly spaced in the circumferential direction and axial direction, and these holes communicate the first combustion chamber 35 with the second combustion chamber 36. The communication holes 34 are sealed with an aluminum seal tape from the outside of the main body portion 31.

A distal end portion 32a of the annular flat plate 32 of the tubular member 30 is abutted to cover the contact portion of the end surface 21 of the cylindrical filter 20 and the top plate 12a, thereby increasing the effect of preventing the short-pass. The opening at the other end of the tubular member 30 is fitted into the outer circumferential surface of the ignition device 40, thereby preventing flame, etc., of the ignition device 40 from flowing directly into the second combustion chamber 36.

The combustion temperature of the first gas generating agent is set to be higher than the combustion temperature of the second gas generating agent. Specific example of the first gas generating agent may be a composition prepared by mixing nitroguanidine as a fuel, strontium nitrate as an oxidizing agent, sodium salt of carboxymethyl cellulose as a binder and a Japanese acid clay as a residue collecting agent. An example of the second gas generating agent may be a composition prepared by mixing guanidine nitrate as a fuel, a basic copper nitrate as an oxidizing agent, sodium salt of carboxymethyl cellulose as a binder and aluminum hydroxide as a cooling agent.

Gas generating agents that have conventional shape and dimensions can be used as the first gas generating agent and the second gas generating agent, and the shape and dimensions of the two gas generating agents may be the same or different. For example, a gas generating agent in the form of a non-perforated pellet may be used as the first gas generating agent, and a gas generating agent in the form of a cylinder having a through hole may be used as the second gas generating agent.

The operation of the gas generator 10 shown in FIG. 1 will be described below. When a collision is detected, a command is received from an impact sensor, the ignition device 40 is activated, the first gas generating agent located inside the first combustion chamber 35 is ignited and combusted, and flame and high-temperature gas are generated. The flame and high-temperature gas are ejected from a plurality of communication holes 34 provided in the tubular member 30 (the seal tape closing the communication holes 34 is ruptured) into the second combustion chamber 36, the second gas generating agent is ignited and combusted, and a gas serving as an airbag inflation medium is generated.

Ignition Device of FIG. 2

An ignition device 40A shown in FIG. 2 will be explained below. FIG. 2 is a partial longitudinal sectional view of the gas generator including an igniter that can be used in the present invention. In the ignition device 40A, an igniter body 42 is fixed to an igniter collar 41.

The igniter body 42 is a well known component and has an ignition portion 43 and a pair of conductive pins 44 (in FIG. 2 the two pins are superimposed and only one is shown). Inside the igniter portion 43, a bridge wire (not shown in the drawing) is bridged between the two conductive pins 44 in a state of contact with an ignition agent. The outer circumferential surface of the igniter body 42 is covered with a resin 45.

The igniter collar 41 is formed from a metal like the closure shell 13 and has a substantially cylindrical shape. The igniter body 42 is attached to an upper opening, as shown in FIG. 2, and fixed to the igniter collar 41 by crimping in a crimping portion 46. A sealing member may be disposed between the igniter collar 41 and the resin 45.

Referring to FIG. 2, the inner diameter of the lower opening of the igniter collar 41 is larger than the diameter of the opening 37 formed in the central portion of the bottom plate 13a of the closure shell 13, and the lower opening is disposed to face the opening 37. Due to a dimensional relationship between the inner diameter of the lower opening of the igniter collar 41 and the diameter of the opening 37 of the bottom plate 13a, a step is formed that is composed of a circumferential edge 37a of the opening, an inner wall surface 13b of the bottom plate in the vicinity of the opening 37 of the housing, and a side surface 41a of the inner wall of the igniter collar.

The igniter collar 41 is welded and fixed by resistance welding in a contact portion 50 (welded portion 50) of the circumferential edge of the lower opening and the bottom plate 13a.

A holder 60 is made from a resin and molded separately. The holder is inserted into the igniter collar 41 to be in contact with the circumferential edge 37a of the opening, the inner wall surface 13b of the bottom plate, the side surface 41a of the inner wall of the igniter collar, and a top surface 41b of the inner wall of the igniter collar. Because the holder 60 is in a contact state in which it is engaged with the step portion composed of the circumferential edge 37a of the opening, the inner wall surface 13b of the bottom plate, and the side surface 41a of the inner wall of the igniter collar, the holder is prevented from being loose even when an outer force is applied.

The holder 60 is composed of Nylon 6-12, but can be also made from a resin (polyacrylates, polybutylene terephthalate, polyphenylene sulfide, or liquid-crystalline polymers) disclosed in JP-A No. 2003-161599.

The space surrounded by the holder 60 and part of the igniter body 42 serves as a plug accommodation chamber 55 for inserting a plug to be connected to the conductive pin 44. A groove 61 which is continuous in the circumferential direction is formed at the inner wall surface (internal wall surface of the holder 60) of the plug accommodation chamber 55. The groove 61 acts to prevent the inserted plug from falling out.

The holder 60 used in the present invention is molded by injection-molding and, therefore, cutting work such as needed in the case of metals is not required and the groove 61 can be easily formed. Furthermore, when a metal part (retainer 6) and a resin part (body 8) are injection-molded together as in the configuration shown in FIG. 1 and FIG. 2 of U.S. Pat. No. 6,763,764, antirust treatment such as plating has to be provided in advance on the metal part (retainer 6). In accordance with the present invention, the igniter collar 41 and the holder 60 are not molded together by injection-molding and the holder 60 that was molded separately is inserted into the igniter collar 41. Furthermore, because the igniter body 42 is fixed by crimping, the above-described antirust treatment is not necessary.

In the case the igniter 40A shown in FIG. 2 is used, the attachment procedure of the igniter 40A to the gas generator 10 shown in FIG. 1 will be described below.

First, the igniter body 42 is fixed to the igniter collar 41. Then, the holder 60 that was molded separately is inserted into the igniter collar 41. The igniter 40A is then placed in a predetermined position (position facing the opening 37) on the closure shell 13 and welded in the welding portion 50, thereby fixing the bottom plate 13a and the igniter collar 41. By thus fixing the bottom plate 13a and the igniter collar 41, the holder 60 is also fixed at the same time.

Figure 3:
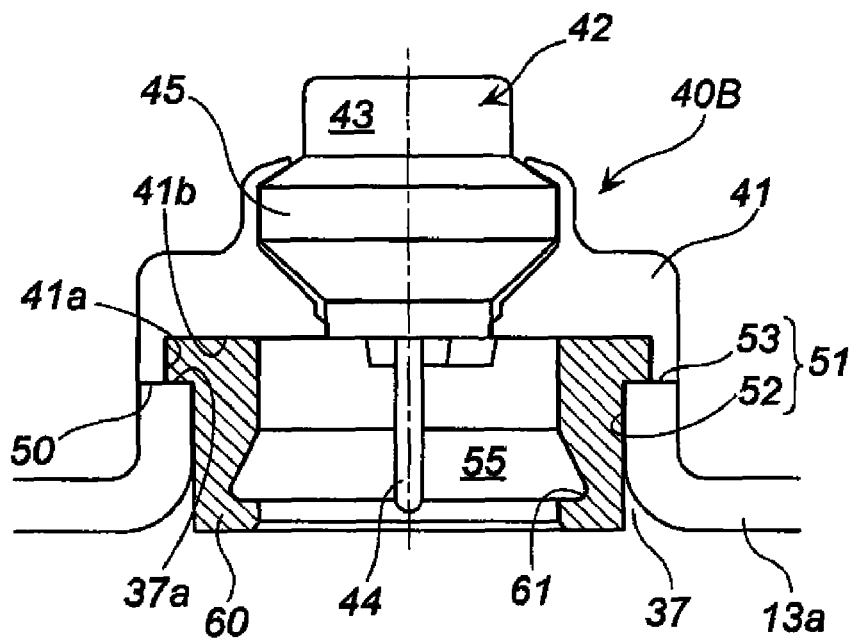
FIG. 3 shows a longitudinal sectional view of the igniter of an embodiment different from that shown in FIG. 2 and an attachment structure thereof.

Ignition Device of FIG. 3

An ignition device 40B shown in FIG. 3 will be described below. FIG. 3 is a partial longitudinal sectional view of the gas generator including an igniter of another embodiment that can be used in the present invention. In the ignition device 40B, the igniter body 42 is fixed to the igniter collar 41. The reference symbols identical to those of FIG. 2 denote identical parts.

The bottom plate 13a around the opening 37 is deformed to protrude towards the inside of the housing 11 and an annular wall surface portion S1 is formed. The annular wall surface portion 51 has an annular circumferential wall surface 52 formed by the bottom surface 13a of the housing prior to processing and an annular distal end surface 53 formed by a circumferential edge of the opening 37 prior to processing.

The holder 60 is made from a resin and molded separately, similarly to the holder shown in FIG. 2. The holder is inserted to be in contact with the annular circumferential wall surface 52, the annular distal end surface 53, the inner wall side surface 41a of the igniter collar, and part of the inner wall top surface 41b of the igniter collar. Because the holder 60 is in a contact state in which it is engaged with the step portion formed by the annular circumferential wall surface 52, the annular distal end surface 53, and the inner wall side surface 41a of the igniter collar, the holder is prevented from being loose even when an outer force is applied.

In the case the igniter 40B shown in FIG. 3 is used, the attachment procedure of the igniter 40B to the gas generator 10 shown in FIG. 1 will be described below.

First, the igniter body 42 is fixed to the igniter collar 41. Then, the holder 60 that was molded separately is inserted into the igniter collar 41. The igniter 40B is then placed in a predetermined position (position in which the circumferential edge of the lower opening of the igniter 40B abuts against the annular distal end surface 53) on the closure shell 13 and welded in the welding portion 50, thereby fixing the annular wall surface portion 51 and the igniter collar 41. By thus fixing the annular wall surface portion 51 and the igniter collar 41, the holder 60 is also fixed at the same time. Further, in the attachment structure of FIG. 3, in comparison with the attachment structure of FIG. 2 the welding portion 50 and the groove 61 formed in the inner wall surface of the holder 60 are positioned apart from each other. Therefore, the effect of welding heat on the inner wall surface of the holder 60 is decreased. Therefore, the groove 61 has higher resistance to deformation induced by the welding heat.

Figure 4:
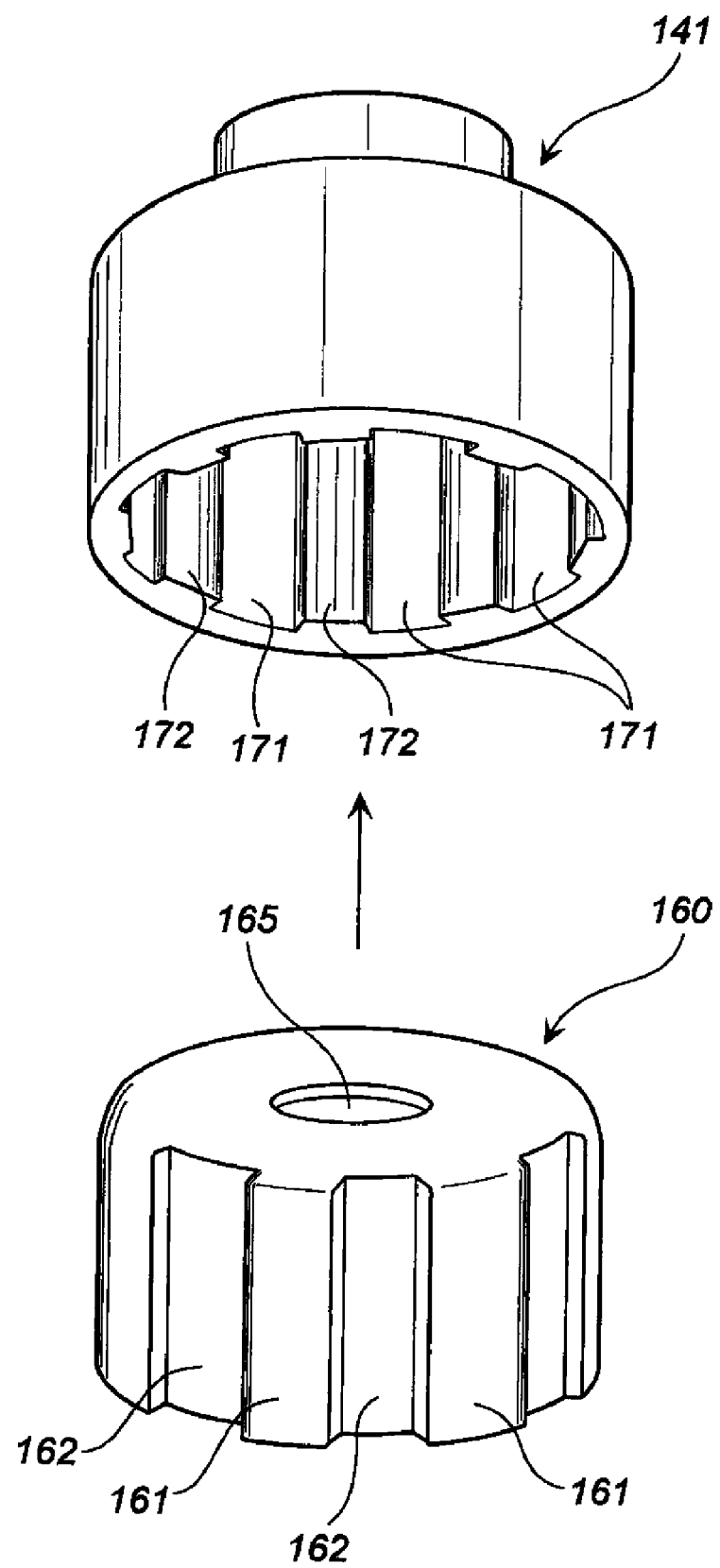
FIG. 4 shows a perspective view showing an assembly of an igniter collar and a holder that can be used in the gas generator according to the present invention.

Igniter Collar and Holder of FIG. 4

FIG. 4 is a perspective view illustrating an assembly of an igniter collar and a holder that can be used in the present invention.

An igniter collar 141 has convex portions 172 and concave portions 171 formed alternately in the circumferential direction on the inner wall surface.

A holder 160 that is inserted into the igniter collar 141 has concave portions 162 and convex portions 161 formed alternately in the circumferential direction on the outer wall surface. An orifice 165 formed in the top surface is, for example shown in FIG. 2, an orifice for inserting the conductive pin 44 of the igniter 40A.

The convex portions 172 of the igniter collar 141 and the concave portions 162 of the holder 160 are formed so that they can be mated together, and the concave portions 171 of the igniter collar 141 and the convex portions 161 of the holder 160 are formed so that they can be mated together.

As shown in FIG. 4, when the holder 160 is inserted into the igniter collar 141, the positions of the convex portions 172 and the concave portions 162 and the positions of the concave portions 171 and the convex portions 161 are matched so that the concave portions 162 are fitted onto the convex portions 172, and the convex portions 161 are fitted into the concave portions 171. As a results the holder 160 inserted into the igniter collar 141 is prevented from rotating in the circumferential direction. Thus, even if subjected to external vibrations during transportation of the gas generator using the igniter collar 141 and the holder 160 of the assembly shown in FIG. 4, the holder 160 does not rotate and, therefore, can be easily connected, and the operation of returning the rotated holder to the original position and readjusting the connection position of the plug is unnecessary.

Figure 5:
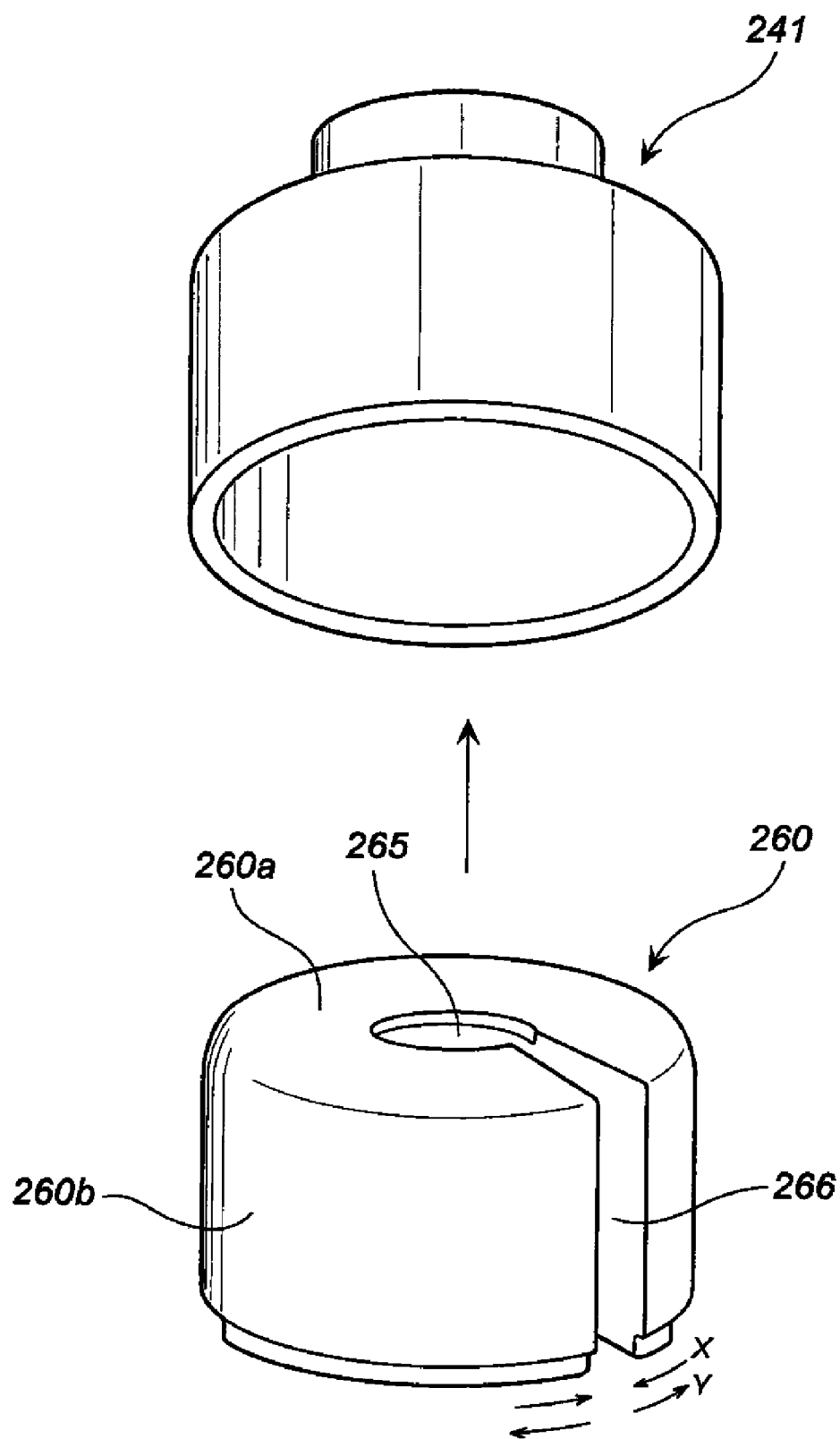
FIG. 5 shows a perspective view showing an assembly of an igniter collar and a holder of another embodiment that can be used in the gas generator according to the present invention.

Igniter Collar and Holder of FIG. 5

FIG. 5 is a perspective view illustrating an assembly of an igniter collar and a holder of another embodiment.

In an igniter collar 241, both the inner wall surface and the outer wall surface are smooth. A holder 260 that is inserted into the igniter collar 241 is made from an elastic material such as a synthetic resin or a rubber.

In the holder 260, an orifice 265 for inserting a conductive pin is formed in the central portion of a top surface 260*a*, and a continuous cleavage portion 266 integrated with the orifice 265 is formed in the top surface 260*a* and a circumferential surface 260*b*. If an outer force is applied to the cleavage portion 266, the cleavage portion is contracted in the X direction in the drawing and closed. When the outer force is removed, the cleavage portion opens in the Y direction shown in the drawing and restores the initial shape.

As shown in FIG. 5, by applying an external force when the holder 260 is inserted into the igniter collar 241, the holder is inserted in a state in which the cleavage portion 266 is closed, and when the external force is thereafter released, the holder 260 restores the original shape. As a result, the circumferential surface 260*b* presses against the inner wall surface of the igniter collar 241, thereby fixing the holder 260 and preventing the holder from rotating or falling off.

When an assembly of the igniter collar 241 and the holder 260 shown in FIG. 5 is used, the igniter body is fixed to the igniter collar 241, the igniter collar 241 is welded and fixed to the bottom plate 13*a*, and the holder 260 is then inserted. Therefore, the holder 260 is not affected by the welding heat. If necessary the holder rotation preventing means such as shown in FIG. 4 can be also provided in the configuration shown in FIG. 5.

The invention thus described, it will be obvious that the same may be varied in many ways. Such variations are no to be regarded as a departure from the spirit and scope of the invention, and all such modifications as would be obvious to one skilled in the art are intended to be included within the scope of the following claims.

The invention claimed is:

1. A gas generator for a restraining apparatus of a vehicle comprising:
   a housing having an opening formed in a bottom plate thereof and a gas discharge port;
   a gas source; and
   an ignition device accommodated inside the housing, the ignition device including,
   an igniter body which has a conductive pin,
   an igniter collar having a plug-accommodating chamber for inserting a plug to be connected with the conductive pin, the igniter collar being fixed, from an inside of the housing, to the bottom plate such that an upper opening of the igniter collar is attached to the igniter body and a lower opening of the igniter collar faces the opening in the bottom plate of the housing, and
   a holder being an independent member formed of a non-electroconductive material and disposed inside the igniter collar, the holder being fixed in a state of contact with the igniter collar and a housing wall surface including a circumferential edge of the opening.

2. The gas generator for a restraining apparatus of a vehicle according to claim 1, wherein
   the igniter collar has an inner diameter larger than a diameter of the opening of the housing and is disposed inside the housing over the opening; and
   the holder is fixed in a state of contact with a circumferential edge of the opening of the housing, an inner wall surface located in the vicinity of the opening of the housing, and an inner wall surface of the igniter collar.

3. The gas generator for a restraining apparatus of a vehicle according to claim 1, wherein
   a wall surface around the opening of the housing protrudes inwardly to form an annular wall surface portion;
   the annular wall surface portion has an annular circumferential wall surface formed of an outer wall surface of the housing prior to processing and an annular distal end surface formed of a circumferential edge of the opening prior to processing;
   the igniter collar is fixed to a part of the annular distal end surface; and
   the holder is fixed in a state of contact with a remaining portion of the annular distal end surface, the annular circumferential wall surface, and an inner wall surface of the igniter collar.

4. The gas generator for a restraining apparatus of a vehicle according to claim 1, wherein
   an inner wall surface of the igniter collar has convex portions and concave portions, an outer wall surface of the holder that is in contact with the inner wall surface of the igniter collar has convex portions and concave portions that correspond in shape to convex portions and concave portions of the inner wall surface of the igniter collar, and the convex portions and concave portions of the respective wall surfaces that are brought into contact are mutually engaged so that the holder is prevented from rotating in the circumferential direction.

5. The gas generator for a restraining apparatus of a vehicle according to claim 1, wherein
   the holder is an elastic holder formed of an elastic material and includes a top surface having an orifice in a central portion and a circumferential surface, the top surface and the circumferential surface are provided with a cleavage portion being integral with the orifice, the cleavage portion is formed to be contracted, when an external force is applied, and to be restored to the original form, when the external force is released; and
   the elastic holder disposed inside the igniter collar is fixed in a state of pressing against the inner wall surface of the igniter collar.

\* \* \* \* \*